(12) United States Patent
Gurevich et al.

(10) Patent No.: US 7,255,275 B2
(45) Date of Patent: Aug. 14, 2007

(54) LASER POWER CONTROL ARRANGEMENTS IN ELECTRO-OPTICAL READERS

(75) Inventors: Vladimir Gurevich, Stony Brook, NY (US); Edward Barkan, Miller Place, NY (US); Igor Vinogradov, Bay Shore, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 107 days.

(21) Appl. No.: 11/254,090

(22) Filed: Oct. 19, 2005

(65) Prior Publication Data

US 2007/0057062 A1    Mar. 15, 2007

Related U.S. Application Data

(60) Provisional application No. 60/716,304, filed on Sep. 12, 2005.

(51) Int. Cl.
*G06K 7/10* (2006.01)

(52) U.S. Cl. ............ 235/455; 235/454; 235/436; 235/439; 235/462.01; 235/472.01

(58) Field of Classification Search ........... 235/455, 235/436, 439, 462.25; 372/38.09
See application file for complete search history.

(56) References Cited

U.S. PATENT DOCUMENTS

| | | | |
|---|---|---|---|
| 5,677,523 A * | 10/1997 | Coleman | 235/455 |
| 5,895,908 A * | 4/1999 | Kawai et al. | 235/462.3 |
| 6,629,638 B1 * | 10/2003 | Sanchez | 235/454 |
| 6,981,645 B2 * | 1/2006 | Leach | 235/462.25 |

\* cited by examiner

*Primary Examiner*—Seung Ho Lee
(74) *Attorney, Agent, or Firm*—Kirschstein, et al.

(57) ABSTRACT

Laser power control arrangements interrupt power to a laser used in electro-optical readers upon detection of an over-power condition not conforming to preestablished standards to meet prevalent safety standards.

11 Claims, 3 Drawing Sheets

LASER POWER CONTROL ARRANGEMENTS IN ELECTRO-OPTICAL READERS

CROSS REFERENCE TO RELATED APPLICATION

This application claims the benefit of U.S. Provisional Patent Application Ser. No. 60/716,304, filed Sep. 12, 2005, commonly assigned herewith.

BACKGROUND OF THE INVENTION

1. Field of the Invention

The present invention generally relates to electro-optical readers, such as laser scanners for reading indicia, such as bar code symbols and, more particularly, to laser power control arrangements for enhancing safety.

2. Description of the Related Art

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector which detects light along the scan line that is reflected or scattered from the symbol. The photodetector or sensor is positioned such that it has a field of view which ensures the capture of the reflected or scattered light, and converts the latter into an electrical analog signal.

In retroreflective light collection, a single optical component, e.g., a reciprocally oscillatory mirror, such as described in U.S. Pat. Nos. 4,816,661 or 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam and has a large field of view. The reflected laser light may trace across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Although reading performance is enhanced when the output power of the laser is increased, government regulatory safety standards dictate the maximum power output of the laser for human safety. Some of these standards require that the output power of the laser does not exceed regulatory limits even when control circuitry that normally regulates the laser output power fails.

For example, a monitor photodiode inside the laser housing is normally operative for monitoring the laser output power. The monitor photodiode is part of a feedback circuit for maintaining the laser output power constant during operation. If the monitor photodiode were to fail, or to become electrically disconnected from the feedback circuit, then the feedback signal would be lost, and the feedback circuit would increase the laser output power, possibly to a level exceeding regulatory limits.

Another example involves a drive transistor electrically connected in series with the laser and normally operative to generate a drive current to energize the laser. If the drive transistor were to fail, or to become electrically disconnected from the laser, then the laser output power might increase to levels exceeding regulatory limits, again compromising user and bystander safety.

SUMMARY OF THE INVENTION

OBJECTS OF THE INVENTION

Accordingly, it is a general object of this invention to control the power output of the laser to meet safety standards.

It is an additional object of the present invention to deenergize the laser upon detection that the laser output power exceeded a preestablished safety standard.

It is another object of the present invention to increase safety without adversely impacting on reader performance.

FEATURES OF THE INVENTION

In keeping with the above objects and others which will become apparent hereinafter, one feature of the present invention resides, briefly stated, in a laser power control arrangement in an electro-optical reader for reading indicia, such as bar code symbols, by directing a laser beam from a laser through a window supported by a housing to indicia to be read.

The arrangement includes a scanner for sweeping the laser beam over a scan angle larger than the window between overscan regions located within the housing and away from the window. An over-power circuit is operative for detecting an over-power condition in which an output power of the laser beam exceeds a preestablished threshold. The over-power circuit includes an over-power component at one of the overscan regions for enabling detection of the output power of the laser beam. A control circuit is operative for deenergizing the laser upon detection of the over-power condition.

In one embodiment, the over-power component is a target, preferably a label affixed to the one overscan region, or features marked or molded into the one overscan region. The target is operative for reflecting the laser beam incident thereon to a main photodetector operative for detecting light scattered off the indicia. The photodetector generates an over-power signal having a magnitude indicative of the output power of the laser beam. The mounting of the target away from the window does not cause any interference with the outgoing laser beam exiting the housing, nor does the generation of the over-power signal by the main photodetector interfere with the latter's chief task of generating a signal indicative of scattered light from the indicia.

The over-power circuit compares the magnitude of the over-power signal with a reference value and generates a control signal when the magnitude of the over-power signal exceeds the reference value. The control signal is conducted to a microprocessor which opens a switch connected in series between the laser source and a power source, thereby interrupting power to the laser in the over-power condition. Power need not be completely interrupted. It is sufficient for the power to be reduced to bring the laser back to a condition of safety in which the output power is below the regulatory limits.

In another embodiment, the main photodetector compares the amplitude of the signal indicative of scattered light from the indicia with a maximum value recorded in the microcontroller at manufacture during a calibration mode. For example, a white card can be placed against the window 13 during the calibration mode. A maximum amplitude of a signal indicative of light reflected off the white card is stored in the microcontroller. Thereupon, during reading, if the amplitude of the signal is above a preestablished value, for example, 50% of the stored maximum amplitude, then the laser is shut off, or at least its power is reduced.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
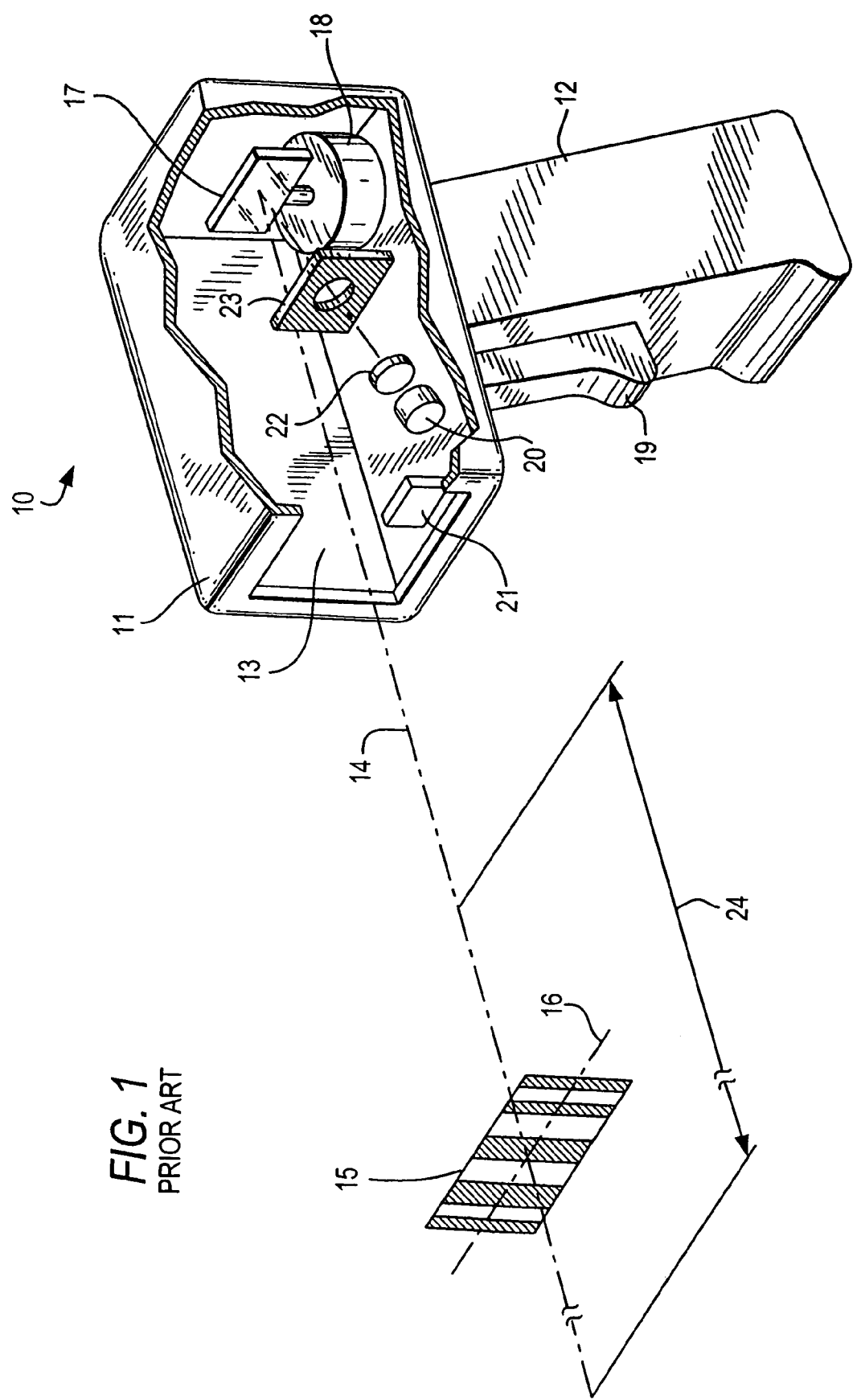
FIG. 1 is a perspective view of an electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia. FIG. 1 shows an indicium 15 as one example of a "symbol" to be read.

FIG. 1 depicts a handheld laser scanner device 10 for reading symbols. The laser scanner device 10 includes a housing having a barrel portion 11 and a handle 12. Although the drawing depicts a handheld pistol-shaped housing, the invention may also be implemented in other types of housings such as a desk-top workstation or a stationary scanner. In the illustrated embodiment, the barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes an energizable laser source 20 mounted within the housing. The laser source 20 generates the laser beam 14. A main photodetector 21 is positioned within the housing to collect at least a portion of the light reflected and scattered from the bar code symbol 15. The main photodetector 21, as shown, faces toward the window 13 and has a static, wide field of view characteristic of the non-retro-reflective readers described above. Alternatively, in a retro-reflective reader, a convex portion of the scan mirror 17 may focus collected light on the main photodetector 21, in which case the main photodetector faces toward the scan mirror. As the beam 14 sweeps the symbol 15, the main photodetector 21 detects the light reflected and scattered from the symbol 15 and creates an analog electrical signal proportional to the intensity of the collected light.

A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects and scatters a portion of the laser light. The main photodetector 21, shown mounted in the scanner housing 11 in a non-retro-reflective position, detects the reflected and scattered light and converts the received light into an analog electrical signal. The main photodetector could also be mounted in a retro-reflective position facing the scan mirror 17. The system circuitry then converts the analog signal to a pulse width modulated digital signal which a microprocessor-based decoder decodes according to the characteristics of the bar code symbology rules.

Figure 2:
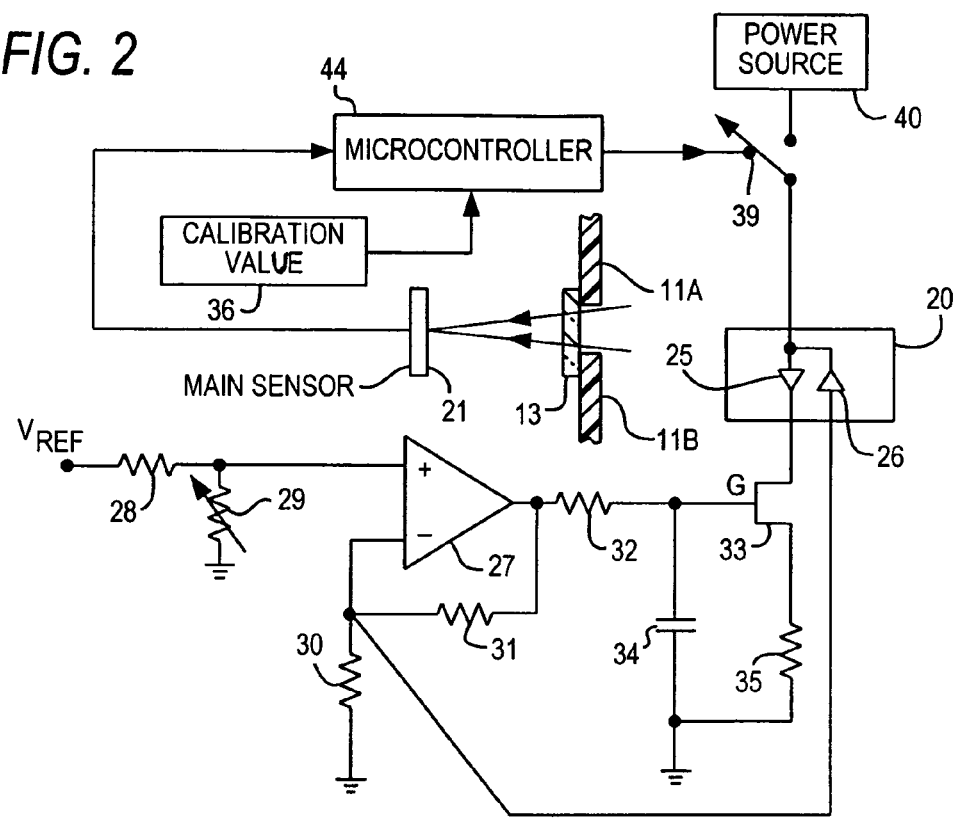
FIG. 2 is a part-diagrammatic, circuit schematic depicting one embodiment of a laser power control arrangement in accordance with the present invention especially useful in the reader of FIG. 1.

As shown in FIG. 2, the laser source 20 includes a laser diode 25 and a monitor photodiode 26 within the laser source. The monitor photodiode 26 is operative for monitoring the output power of the diode 25. The photodiode 26 is part of a feedback circuit operative for maintaining the laser output power constant. The feedback circuit includes a comparator 27 having a reference voltage applied to a positive input of the comparator through a voltage divider comprised of resistors 28, 29. The photodiode 26 is connected to a negative input of the comparator via a resistive network including resistors 30, 31. The output of the comparator 27 is conducted through a resistor 32 and capacitor 34 to a gate G of a field effect transistor (FET) 33. The drain output of the FET 33 is connected to the laser diode 25. The source output of the device 33 is connected to ground through a resistor 35.

As described so far, the circuit of FIG. 2 is conventional in that the interior monitor photodiode 26 detects changes in output power of the laser beam emitted by laser diode 25 and sends a feedback signal to the comparator 27 for driving the FET 33 to allow more or less current to pass through the resistor 35 and, in turn, through the laser diode 25. The greater this current, the greater the laser output power, and vice versa.

The laser diode 25 is energized by a power source 40 which includes a drive transistor for generating a drive current to energize the laser diode 25. Even if the drive transistor, or the monitor photodiode 26, or any of the electrical components in the power source or the feedback circuit for the monitor photodiode fail, or become electrically disconnected, then regulatory safety limits can still be obtained by a laser power control arrangement which, in accordance with this invention, monitors the output power of the laser diode 25 and deenergizes the latter when the monitored output power exceeds a preestablished threshold.

In FIG. 2, the main photodetector 21 receives light scattered from the symbol 15 and generates an electrical return signal whose amplitude is proportional to the intensity of the received light. This return signal is fed to a microcontroller 44 that decodes the symbol.

At manufacture during a calibration mode, a white card is placed against the window 13 and is operative for reflecting virtually all of the laser light impinging on the white card back to the photodetector 21 which, in turn, generates the return signal with a maximum amplitude. This maximum amplitude or calibration value is stored in a memory 36 associated with the microcontroller.

During reading, the amplitude of the return signal generated by the photodetector 21 is compared to the stored calibration value. If the return signal amplitude exceeds, for example, 50% of the calibration value, then this represents an over-power condition, and power to the laser is interrupted or reduced. The microcontroller generates a control signal that opens a normally-closed switch 39 electrically connected between a power source 40 and the laser source 20, thereby interrupting power to the laser source. The switch 39 can also be a relay, or a bipolar transistor, or a field effect transistor, in which case, it is sufficient that the power to the laser source is reduced.

Figure 3:
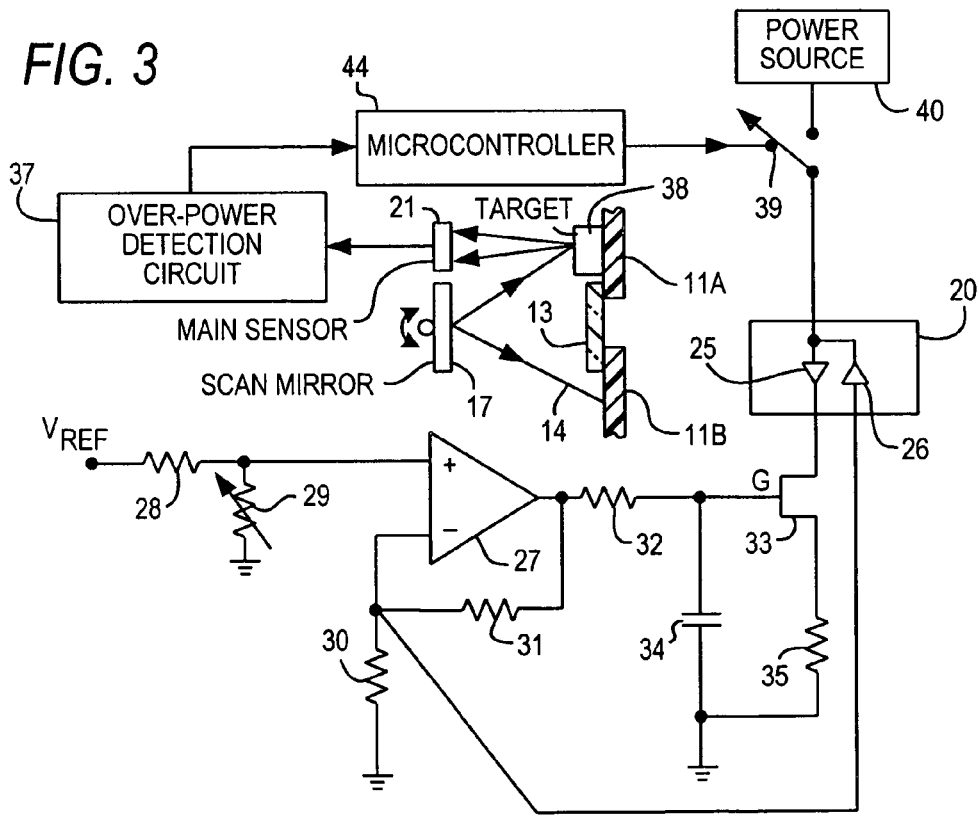
FIG. 3 is a part-diagrammatic circuit, schematic of another embodiment of a laser power control arrangement in accordance with the present invention for use in the reader of FIG. 1.

In FIG. 3, the aforementioned scan mirror 17 is depicted as being oscillated in opposite circumferential directions by a double-headed arrow by the drive motor 18 in order to sweep the laser beam 14 over a scan angle through the exit window 13 which, as shown in FIG. 3, is depicted as a light transmissive element mounted on the housing 11. As shown, the scan angle is wider than the width of the window 13 and, indeed, this is deliberate so that the laser beam travels between one overscan region 11A of the housing, across the window 13, and another overscan region 11B. The overscan regions are within the housing at opposite sides of the window, and the laser beam 14 is blocked by the overscan regions from exiting the housing.

In the embodiment of FIG. 3, wherein like elements with those of FIG. 2 have been identified with like reference numerals, the main photodetector 21 that already exists in the reader for detecting light reflected off the symbol 15, is employed for detecting an over-power condition. To use the main photodetector 21 for detecting the over-power condition without interfering with its chief function of detecting light reflected off the symbol and passing through the window 13, a target 38 is located at at least one of the overscan regions 11A, B. The target 38 is situated to reflect the impinging laser beam 14 to the main photodetector 21, but only when the laser beam 14 is not passing through the window 13. The target 38 can be in the form of a label affixed to an interior surface of one of the overscan regions, or it can be features marked or molded into said interior surface.

An over-power detection circuit 37 is used to detect when the magnitude of the electrical signal generated by the main photodetector 21 exceeds a threshold value dictated by regulatory agencies, and to generate an over-power signal which is conducted to the microcontroller 44 to open the switch 39 when the over-power condition has been detected. The detection circuit is operational only during the time that the light beam 14 is impinging the target 38 at the over-scan region.

Figure 5:
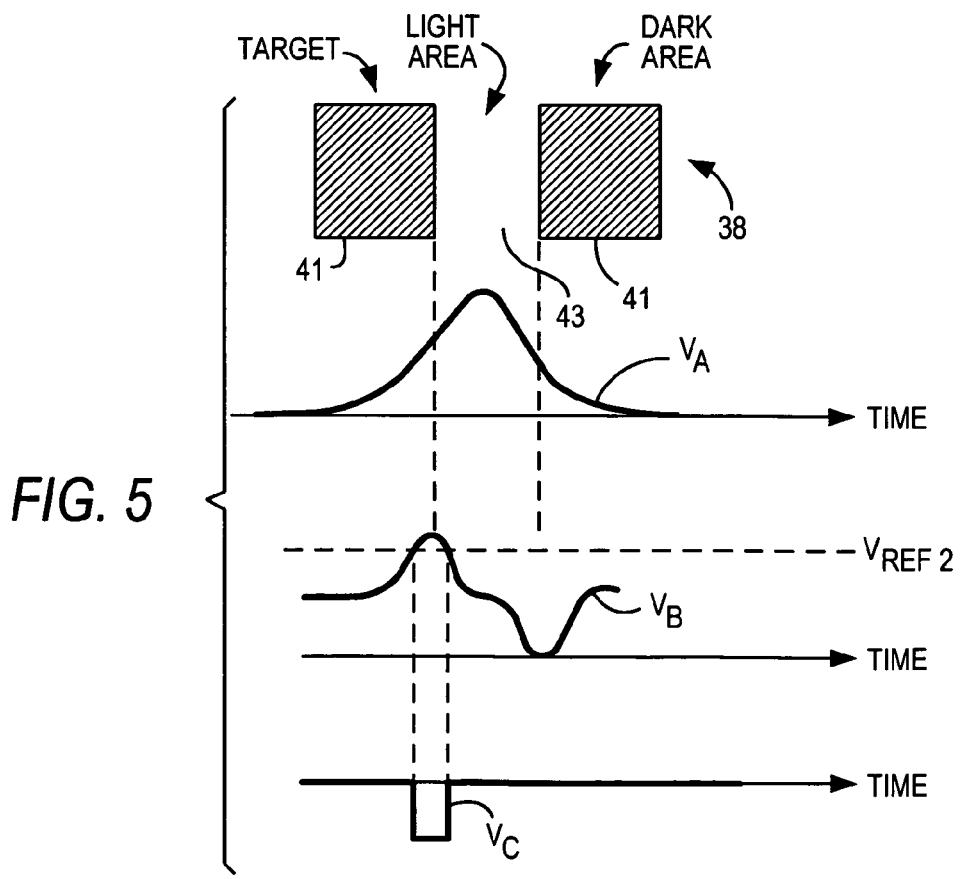
FIG. 5 is a group of waveforms to assist in understanding the operation of the circuit of FIG. 4, together with an exemplary target.

The detection of the over-power condition must be reliable even in the presence of bright ambient light, such as sunlight, which also impinges on the main photodetector 21. To render the reader less sensitive to ambient light, the target 38 is made, as shown in FIG. 5, of a pattern of alternating lighter and darker areas, or black bars 41 and white spaces 43, similar in appearance to the bar code symbol 15. For this application, however, there is no need for more than a single space 43 and a single bar 41. When the light beam 14 sweeps over the lighter and darker areas of the target 38, the difference in the intensity of the reflected light and, in turn, the difference in the magnitudes of the electrical signals generated by the main photodetector 21 is determined by the over-power detection circuit 37. This difference is only dependent upon laser output power, and not on ambient light, so that bright ambient light will not cause a false determination of the over-power condition.

Figure 4:
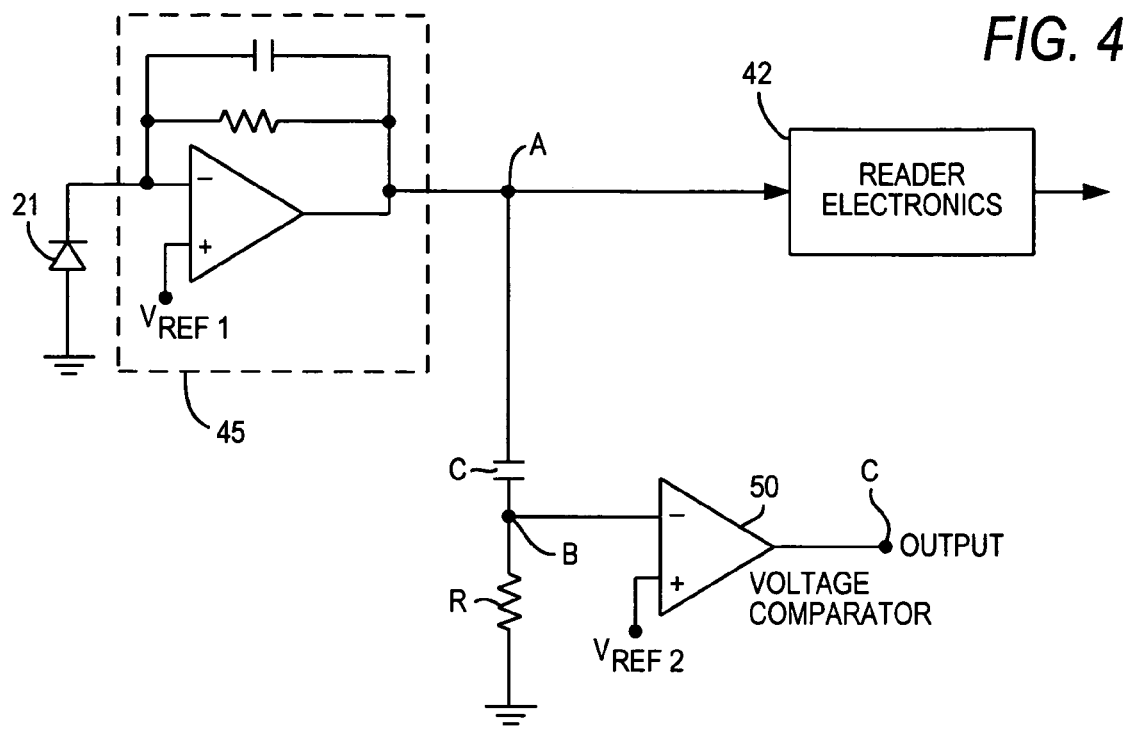
FIG. 4 is a circuit schematic of an over-power measurement circuit used in the embodiment of FIG. 3.

As shown in FIG. 4, the main photodetector 21 is electrically connected to a conventional preamplifier stage 45 and, in turn, to a conventional reader electronics circuit 42 which includes, among other things, additional gain stages, filter stages, a digitizer, a decoder and an automatic gain control circuit, as conventionally used to read the symbol 15. FIG. 5 depicts the voltage waveform $V_A$ at point A in which the amplified voltage signal has its greatest magnitude within the light area 43.

A differentiator 47 comprising a resistor R and a capacitor C is connected to a negative input of a voltage comparator 50 whose positive input is connected to a reference voltage $V_{REF2}$. FIG. 5 depicts the voltage waveform $V_B$ at point B in which the peaks of the differentiated voltage signal correspond to the transitions between the light and dark areas. The comparator 50 is operative to compare the magnitude of the differentiated voltage signal to the reference voltage $V_{REF2}$. If, as shown in FIG. 5, the magnitude of the differentiated voltage signal exceeds the reference voltage $V_{REF2}$, then the comparator 50 will trip and generate a pulse or output control signal $V_C$ at the point C. The control signal $V_C$ is conducted to the microcontroller 44 which, in turn, activates the switch 39 to interrupt power to the laser source.

To make certain that the circuit of FIG. 4 is not fooled by bright or highly reflective objects in the field of view of the reader, which might create strong peaks of large magnitude even if the laser output power is within prescribed safety standards, the output control signal $V_C$ is only accepted by the microcontroller when the light beam 14 is known to be in one of the overscan regions 11A, B of the housing, and where the light beam 14 cannot be incident on any highly reflective objects external to the housing of the reader.

For cost reduction and circuit simplification, the microcontroller 44 can be provided with an on-chip analog-to-digital converter which monitors the differentiated voltage signal at point B and determines whether it has increased in magnitude enough to indicate an over-power condition in which the laser needs to be deenergized. This modification allows the comparator 50 to be eliminated.

In another variant, the comparator 50 can be replaced by a digital gate. A gate usually has a less well-defined threshold voltage than can be obtained with a comparator, but if there is sufficient margin in the reader, that is, the difference between normal laser output power and fault power at which the laser must be deenergized, then the gate can be acceptable.

It will be understood that each of the elements described above, or two or more together, also may find a useful application in other types of constructions differing from the types described above.

While the invention has been illustrated and described as embodied in laser power control arrangements in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A laser power control arrangement in a reader for electro-optically reading indicia, comprising:
   a) an energizable laser for emitting a laser beam to the indicia for reflection therefrom;
   b) a photodetector for detecting light reflected by the indicia during a reading mode, and for generating an electrical signal having a reading amplitude indicative of the light detected by the photodetector;
   c) a microcontroller for comparing the reading amplitude with a maximum amplitude, and for generating a control signal when the reading amplitude differs from the maximum amplitude by a predetermined amount; and
   d) a circuit for deenergizing the laser upon generation of the control signal.

2. The arrangement of claim 1, wherein the photodetector is operative for detecting light reflected by a light-reflecting source during a calibration mode prior to the reading mode, and for generating an electrical signal having the maximum amplitude.

3. The arrangement of claim 2, wherein the microcontroller has a memory in which the maximum amplitude is stored.

4. The arrangement of claim 2, wherein the light-reflecting source is a white-colored sheet.

5. The arrangement of claim 1, wherein the control signal is generated when the reading amplitude exceeds a predetermined fraction of the maximum amplitude.

6. The arrangement of claim 1, wherein the deenergizing circuit includes a switch having one state in which the switch is connected to the laser, and another state in which the switch is electrically disconnected from the laser.

7. A laser power control method, comprising the steps of:
   a) energizing a laser to emit a laser beam to a light-reflecting source for reflection therefrom during a calibration mode;
   b) detecting light reflected by the source during the calibration mode, and generating an electrical signal having a maximum amplitude indicative of the light detected during the calibration mode;
   c) energizing the laser to emit the laser beam to indicia to be electro-optically read for reflection therefrom during a reading mode;
   d) detecting light reflected by the indicia during the reading mode, and generating an electrical signal having a reading amplitude indicative of the light detected during the reading mode;
   e) comparing the reading amplitude with the maximum amplitude, and generating a control signal when the reading amplitude differs from the maximum amplitude by a predetermined amount; and
   f) deenergizing the laser upon generation of the control signal.

8. The method of claim 7, and the step of storing the maximum amplitude.

9. The method of claim 7, wherein the control signal is generated when the reading amplitude exceeds a predetermined fraction of the maximum amplitude.

10. The method of claim 7, wherein the deenergizing step is performed by opening a switch connected to the laser.

11. The method of claim 7, wherein the calibration mode is performed prior to the reading mode.

* * * * *